United States Patent
Yi et al.

(10) Patent No.: US 10,805,061 B2
(45) Date of Patent: Oct. 13, 2020

(54) METHOD AND APPARATUS FOR HANDLING MBSFN SUBFRAMES FOR SHORT TTI IN WIRELESS COMMUNICATION SYSTEM

(71) Applicant: LG ELECTRONICS INC., Seoul (KR)

(72) Inventors: Yunjung Yi, Seoul (KR); Ilmu Byun, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 370 days.

(21) Appl. No.: 15/743,267

(22) PCT Filed: Jul. 20, 2016

(86) PCT No.: PCT/KR2016/007904
§ 371 (c)(1),
(2) Date: Jan. 9, 2018

(87) PCT Pub. No.: WO2017/014558
PCT Pub. Date: Jan. 26, 2017

(65) Prior Publication Data
US 2020/0084054 A1    Mar. 12, 2020

Related U.S. Application Data

(60) Provisional application No. 62/316,575, filed on Apr. 1, 2016, provisional application No. 62/294,291, filed (Continued)

(51) Int. Cl.
*H04L 5/14* (2006.01)
*H04J 1/02* (2006.01)
(Continued)

(52) U.S. Cl.
CPC .............. *H04L 5/1469* (2013.01); *H04J 1/02* (2013.01); *H04J 3/02* (2013.01); *H04L 1/1812* (2013.01);
(Continued)

(58) Field of Classification Search
CPC ..... H04L 12/18; H04L 5/1469; H04L 1/1812; H04L 5/0055; H04J 1/02; H04J 3/02; H04W 72/044; H04W 72/0446
See application file for complete search history.

(56) References Cited

U.S. PATENT DOCUMENTS

| 10,243,720 B2 * | 3/2019 | Lee .......................... H04L 5/006 |
| 2011/0007699 A1 * | 1/2011 | Moon ................... H04L 5/0053 370/329 |

(Continued)

FOREIGN PATENT DOCUMENTS

WO    2014056643    4/2014

OTHER PUBLICATIONS

PCT International Application No. PCT/KR2016/007909, International Search Report dated Oct. 18, 2016, 3 pages.

(Continued)

*Primary Examiner* — Ian N Moore
*Assistant Examiner* — Latresa A McCallum
(74) *Attorney, Agent, or Firm* — Lee Hong Degerman Kang Waimey

(57) ABSTRACT

A method and apparatus for performing a downlink (DL) transmission using a short transmission time interval (TTI) is provided. A network performs a first DL transmission via a first set of subframes which are multicast-broadcast single-frequency network (MBSFN) subframes, and performs a second DL transmission via a second set of subframes using the short TTI. A length of the short TTI is less than 1 ms.

12 Claims, 14 Drawing Sheets

Related U.S. Application Data on Feb. 11, 2016, provisional application No. 62/264,320, filed on Dec. 8, 2015, provisional application No. 62/194,799, filed on Jul. 20, 2015.

(51) Int. Cl.
*H04J 3/02* (2006.01)
*H04L 12/18* (2006.01)
*H04W 72/04* (2009.01)
*H04L 1/18* (2006.01)
*H04L 5/00* (2006.01)

(52) U.S. Cl.
CPC ........... *H04L 12/18* (2013.01); *H04W 72/044* (2013.01); *H04L 5/0055* (2013.01); *H04W 72/0446* (2013.01)

(56) References Cited

U.S. PATENT DOCUMENTS

| | | | |
|---|---|---|---|
| 2013/0077606 A1 | 3/2013 | Wu et al. | |
| 2013/0265982 A1* | 10/2013 | Fwu | H04B 7/0456 370/329 |
| 2014/0293843 A1 | 10/2014 | Papasakellariou et al. | |
| 2014/0328260 A1* | 11/2014 | Papasakellariou | H04L 1/1861 370/329 |
| 2014/0348050 A1 | 11/2014 | Kim et al. | |
| 2015/0103703 A1* | 4/2015 | Zeng | H04W 72/14 370/280 |
| 2015/0146604 A1 | 5/2015 | Kim et al. | |
| 2015/0305003 A1* | 10/2015 | Chen | H04L 1/1822 370/330 |
| 2016/0249329 A1 | 8/2016 | Au et al. | |
| 2018/0176043 A1* | 6/2018 | Kim | H04L 27/2602 |

OTHER PUBLICATIONS

U.S. Appl. No. 15/743,644, Office Action dated Feb. 1, 2019, 25 pages.

PCT International Application No. PCT/KR2016/007904, Written Opinion of the International Searching Authority dated Oct. 18, 2016, 5 pages.

LG Electronics Inc., "Potential Improvement Area for Latency Reduction," 3GPP TSG-RAN WG2 #90, R2-152293, May 2015, 6 pages.

Ericsson, "Areas for reducing latency," 3GPP TSG-RAN WG2 #90, R2-152415, May 2015, 6 pages.

Huawei, "Evaluation on the gains provided by 0.5ms TTI," 3GPP TSG-RAN WG2 #90, R2-152456, May 2015, 11 pages.

* cited by examiner

METHOD AND APPARATUS FOR HANDLING MBSFN SUBFRAMES FOR SHORT TTI IN WIRELESS COMMUNICATION SYSTEM

CROSS-REFERENCE TO RELATED APPLICATIONS

This application is the National Stage filing under 35 U.S.C. 371 of International Application No. PCT/KR2016/007904, filed on Jul. 20, 2016, which claims the benefit of U.S. Provisional Application Nos. 62/194,799, filed on Jul. 20, 2015, 62/264,320, filed on Dec. 8, 2015, 62/294,291, filed on Feb. 11, 2016, and 62/316,575, filed on Apr. 1, 2016, the contents of which are all hereby incorporated by reference herein in their entirety.

BACKGROUND OF THE INVENTION

Field of the Invention

The present invention relates to wireless communications, and more particularly, to a method and apparatus for handling multicast-broadcast single-frequency network (MBSFN) subframes for a short transmission time interval (TTI) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation. Better latency than previous generations of 3GPP radio access technologies (RATs) was one performance metric that guided the design of LTE. LTE is also now recognized by the end-users to be a system that provides faster access to internet and lower data latencies than previous generations of mobile radio technologies. In the 3GPP, much effort has been put into increasing data rates from the first release of LTE (Rel-8) until the most recent one (Rel-12). However, with regard to further improvements specifically targeting the delays in the system little has been done.

Packet data latency is important not only for the perceived responsiveness of the system, but it is also a parameter that indirectly influences the throughput. In addition, to achieve really high bit rates, UE L2 buffers need to be dimensioned correspondingly. The longer the round trip time (RTT) is, the bigger the buffers need to be. The only way to reduce buffering requirements in the UE and eNB side is to reduce latency. Further, radio resource efficiency could also be positively impacted by latency reductions. Lower packet data latency could increase the number of transmission attempts possible within a certain delay bound, hence higher block error rate (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. voice over LTE (VoLTE)), if keeping the same BLER target. This may improve the VoLTE voice system capacity.

Various pre-scheduling strategies can be used to lower the latency to some extent, but similarly to shorter scheduling request (SR) interval introduced in Rel-9, they do not necessarily address all efficiency aspects. Accordingly, various techniques to reduce latency have been discussed. Specifically, as for one of techniques to reduce latency, a short transmission time interval (TTI) has been discussed.

SUMMARY OF THE INVENTION

The present invention provides a method and apparatus for handling multicast-broadcast single-frequency network (MBSFN) subframes for a short transmission time interval (TTI) in a wireless communication system. The present invention provides a method and apparatus for handling unavailable subframes for a short TTI in a backward compatible manner.

In an aspect, a method for performing, by a network, a downlink (DL) transmission using a short transmission time interval (TTI) in a wireless communication system is provided. The method includes performing a first DL transmission via a first set of subframes which are multicast-broadcast single-frequency network (MBSFN) subframes, and performing a second DL transmission via a second set of subframes using the short TTI. A length of the short TTI is less than 1 ms.

In another aspect, an eNodeB (eNB) in a wireless communication system is provided. The eNB includes a memory, a transceiver, and a processor, coupled to the memory and the transceiver, that controls the transceiver to perform a first downlink (DL) transmission via a first set of subframes which are multicast-broadcast single-frequency network (MBSFN) subframes, and controls the transceiver to perform a second DL transmission via a second set of subframes using a short transmission time interval (TTI). A length of the short TTI is less than 1 ms.

MBSFN subframes which are unavailable subframes for short TTI transmission can be handled efficiently.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

Figure 1:
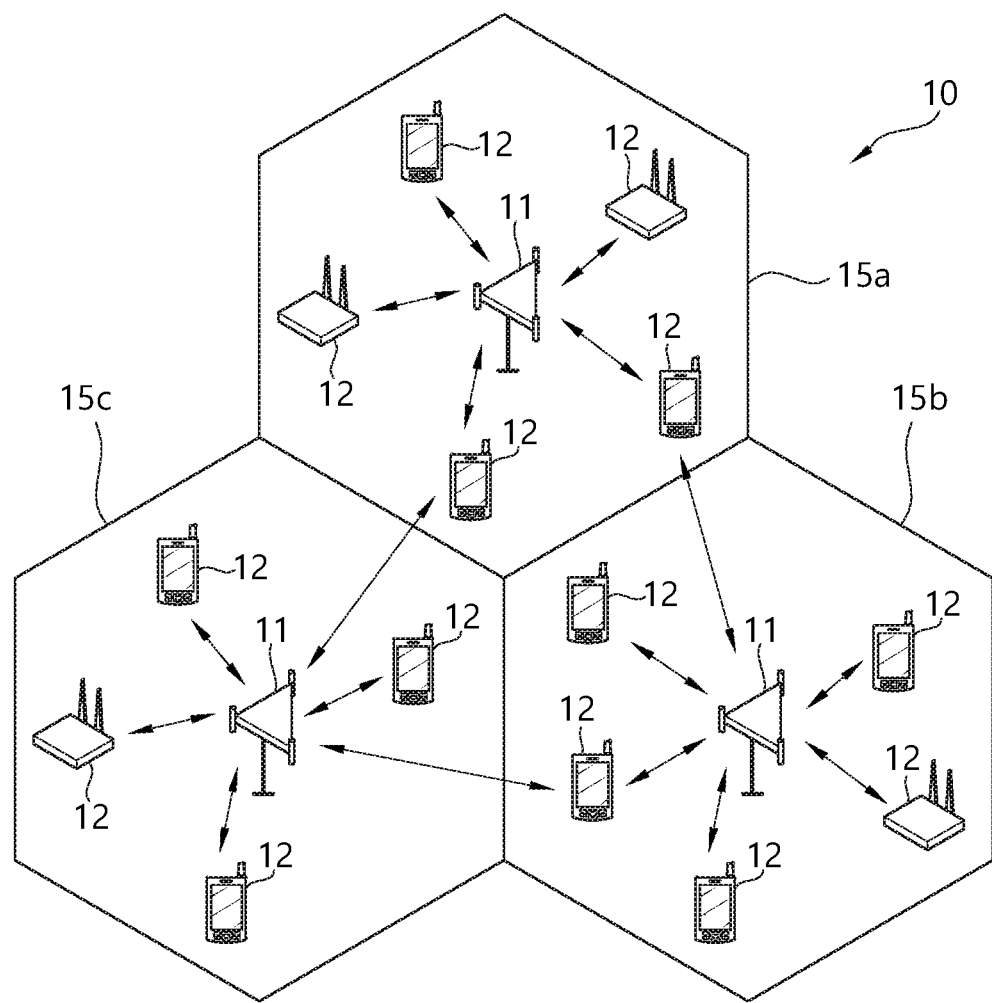
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
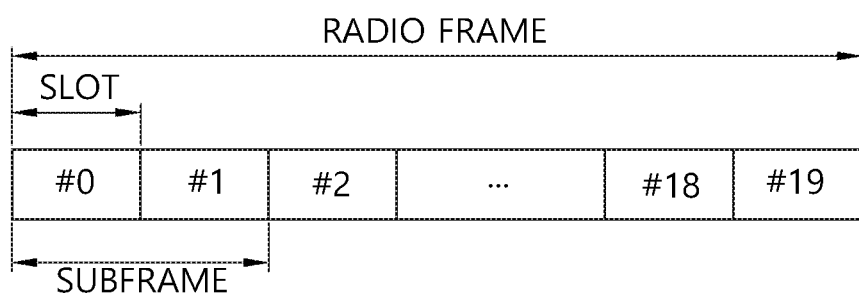
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one transport block by higher layer to physical layer (generally over one subframe) is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
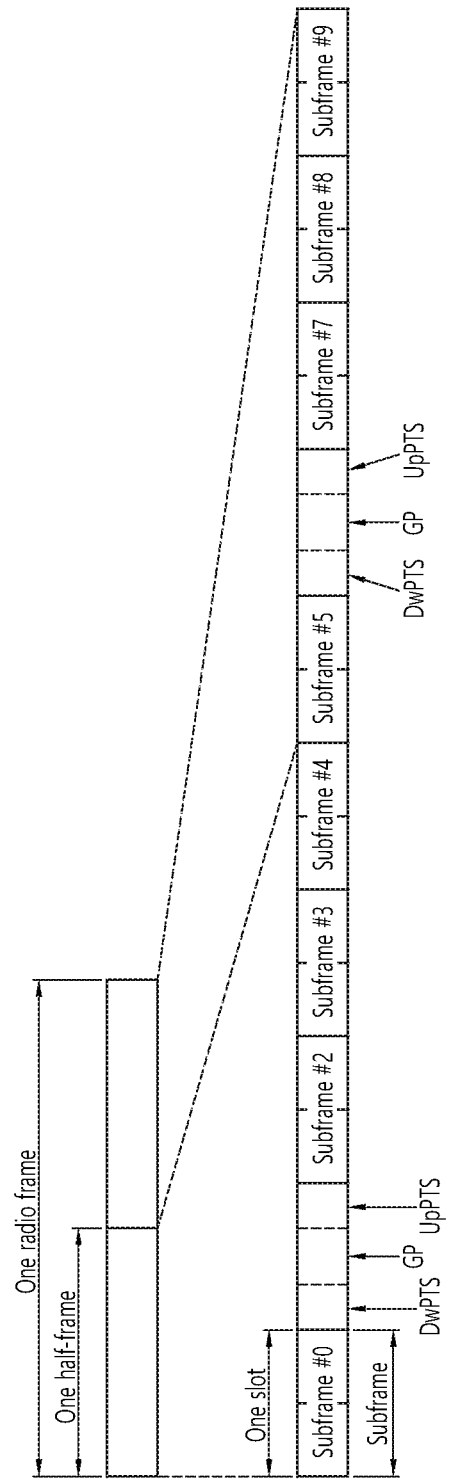
FIG. 3 shows another structure of a radio frame of 3GPP LTE.

FIG. 3 shows another structure of a radio frame of 3GPP LTE. Frame structure described in FIG. 3 is applicable to TDD. Each radio frame of length 10 ms consists of two half-frames of length 5 ms each. Each half-frame consists of five subframes of length 1 ms. Each subframe i is defined as two slots, 2i and 2i+1, of length 0.5 ms each.

The UL-DL configuration in a cell may vary between frames and controls in which subframes UL or DL transmissions may take place in the current frame. The supported UL-DL configurations are listed in Table 1 below.

TABLE 1

| UL-DL configuration | DL-to-UL Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, for each subframe in a radio frame, "D" denotes a DL subframe reserved for DL transmissions, "U" denotes an UL subframe reserved for UL transmissions and "S" denotes a special subframe with the three fields downlink pilot time slot (DwPTS), guard period (GP) and uplink pilot time slot (UpPTS). UL-DL configurations with both 5 ms and 10 ms DL-to-UL switch-point periodicity are supported. In case of 5 ms DL-to-UL switch-point periodicity, the special subframe exists in both half-frames. In case of 10 ms DL-to-UL switch-point periodicity, the special subframe exists in the first half-frame only. Subframes 0 and 5 and DwPTS are always reserved for DL transmission. UpPTS and the subframe immediately following the special subframe are always reserved for UL transmission.

Figure 4:
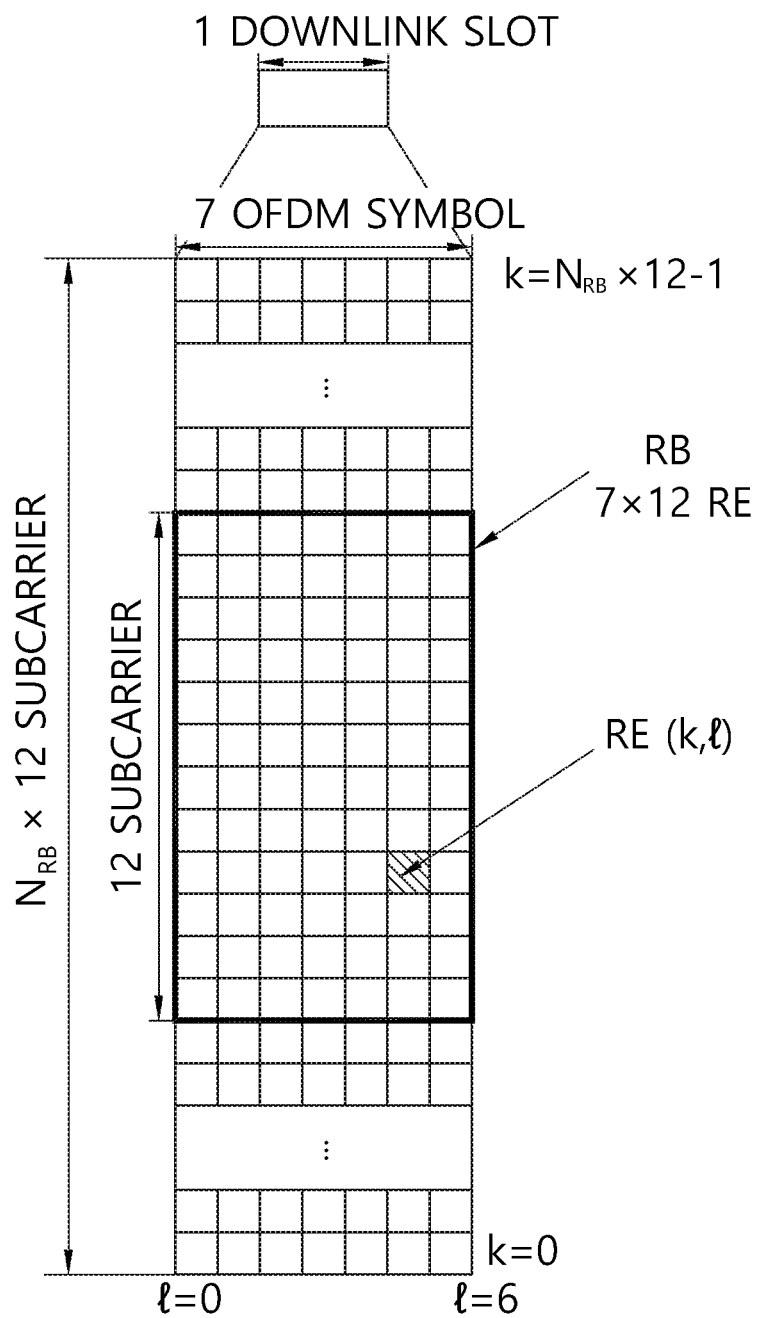
FIG. 4 shows a resource grid for one downlink slot.

FIG. 4 shows a resource grid for one downlink slot. Referring to FIG. 4, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 5:
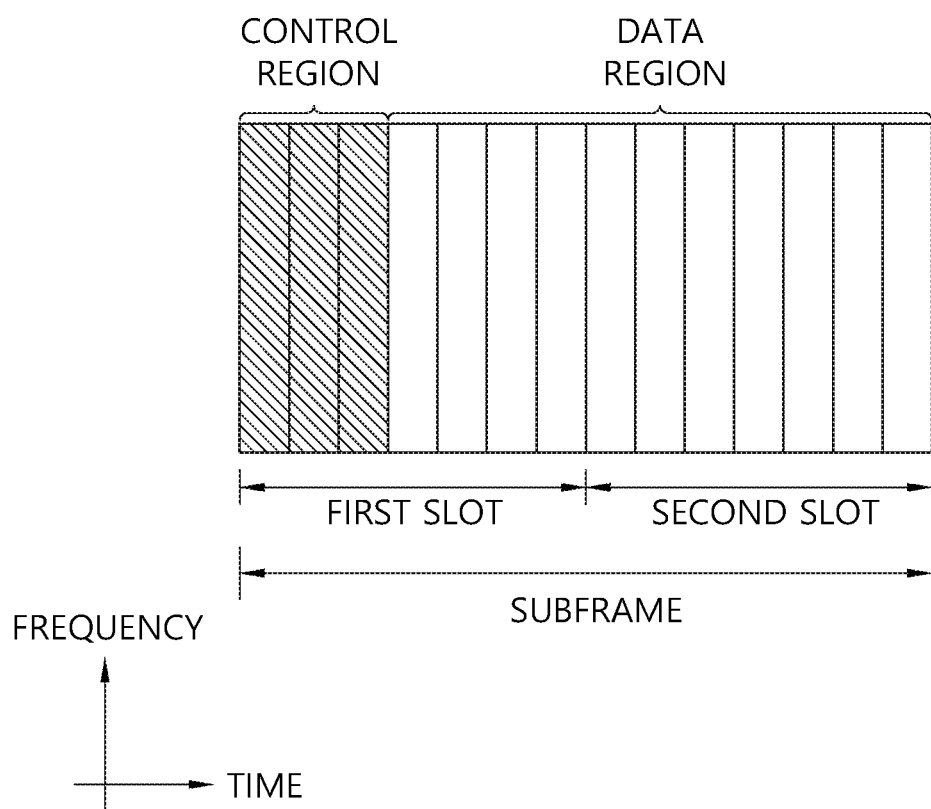
FIG. 5 shows structure of a downlink subframe.

FIG. 5 shows structure of a downlink subframe. Referring to FIG. 5, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

Figure 6:
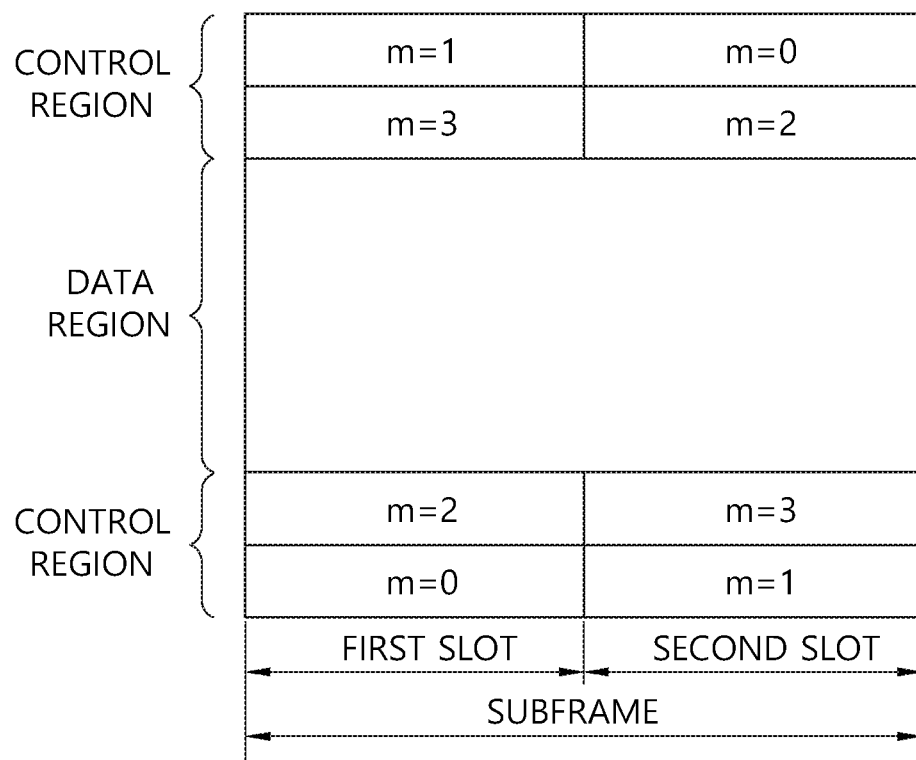
FIG. 6 shows structure of an uplink subframe.

FIG. 6 shows structure of an uplink subframe. Referring to FIG. 6, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

A subset of the DL subframes in a radio frame on a carrier supporting PDSCH transmission can be configured as multicast-broadcast single-frequency network (MBSFN) subframes by higher layers. Each MBSFN subframe is divided into a non-MBSFN region and an MBSFN region. The non-MBSFN region spans the first one or two OFDM symbols in an MBSFN subframe. The MBSFN region in an MBSFN subframe is defined as the OFDM symbols not used for the non-MB SFN region. MBSFN is supported for the multicast control channel (MCH), which is a transport channel. Multiplexing of transport channels using MBSFN and non-MBSFN transmission is done on a per-sub-frame basis. Additional reference symbols, transmitted using MBSFN are transmitted within MBSFN subframes.

In an LTE system, there are multiple components contributing to the total end to end delay for connected UEs. The limitations in performance are in general use case dependent, for which, e.g. UL latency may influence the DL application performance and vice versa. Examples of sources to latency are listed below.

(1) Grant acquisition: A UE with data to send must send a SR and receive a scheduling grant before transmitting the data packet. In order to send a SR, it must wait for a SR-valid PUCCH resource and a corresponding scheduling grant transmitted to the UE in response. When the grant is decoded the data transmission can start over PUSCH.

(2) Random access: If the UL timing of a UE is not aligned, initial time alignment is acquired with the random access procedure. The time alignment can be maintained with timing advance commands from the eNB to the UE. However, it may be desirable to stop the maintenance of UL time alignment after a period of inactivity, thus the duration of the random access procedure may contribute to the overall latency in RRC_CONNECTED. The random access procedure also serves as an UL grant acquisition mechanism (random access based scheduling request). Therefore, for cases where random access is needed, no separate PUCCH based SR procedure/step is needed.

(3) TTI: The transmission of a request, grant, or data is done in subframe chunks with a fixed duration (1 ms), which is the source of a delay per packet exchange between the UE and the eNB.

(4) Processing: Data and control need to be processed (e.g. encoded and decoded) in the UE and eNB. Data processing is a source of processing delays, which are proportional to the transport block (TB) size. The processing of control information is typically less dependent on TB size.

(5) HARQ round trip time (RTT): For UL transmission in FDD, the HARQ ACK for a packet received by the eNB in subframe n is reported in subframe n+4. If a retransmission is needed by the UE, this is done in subframe n+8. Thus, the HARQ RTT is 8 ms for FDD UL. For TDD, RTT depends on TDD configuration. The RTT for DL transmissions is not specified in detail, as the HARQ scheme is asynchronous. The HARQ feedback is available at subframe n+4 in FDD, and retransmissions can typically be scheduled in subframe n+8 or later if needed.

(6) Core/Internet: In the core network, packets can be queued due to congestion and delayed due to transmission over backhaul links. Internet connections can be congested and therefore add to the experienced end-to-end packet delay. EPC and/or Internet delays vary widely. In the context of latency reductions, it is reasonable to assume that latency performance of the transport links is good.

For example, Table 2 shows a typical radio access latency components for a UL transmission from a UE without a valid UL grant.

TABLE 2

| Component | Description | Time (ms) |
|---|---|---|
| 1 | Average waiting time for PUCCH (10 ms SR period/1 ms SR period) | 5/0.5 |
| 2 | UE sends SR on PUCCH | 1 |
| 3 | eNB decodes SR and generates the scheduling grant | 3 |
| 4 | Transmission of scheduling grant | 1 |
| 5 | UE processing delay (decoding of scheduling grant + L1 encoding of UL data) | 3 |
| 6 | Transmission of UL data | 1 |
| 7 | Data decoding in eNB | 3 |
| | Total delay (ms) | 17/12.5 |

Referring to Table 2, assuming Rel-8 functionality, the average waiting time for a PUCCH at a periodicity of 10 ms is 5 ms, leading to a radio access latency sum of 17 ms. With a SR period set to 1 ms, the average waiting time is reduced to 0.5 ms, which would lead to a sum of 12.5 ms.

Table 3 shows a typical radio access latency components for a DL transmission.

TABLE 3

| Component | Description | Time (ms) |
|---|---|---|
| 1 | Processing incoming data | 3 |
| 2 | TTI alignment | 0.5 |
| 3 | Transmission of DL data | 1 |
| 4 | Data decoding in UE | 3 |
| | Total delay (ms) | 7.5 |

From the tables, it can be seen that grant acquisition delay, transmission and data processing times are additive.

Figure 7:
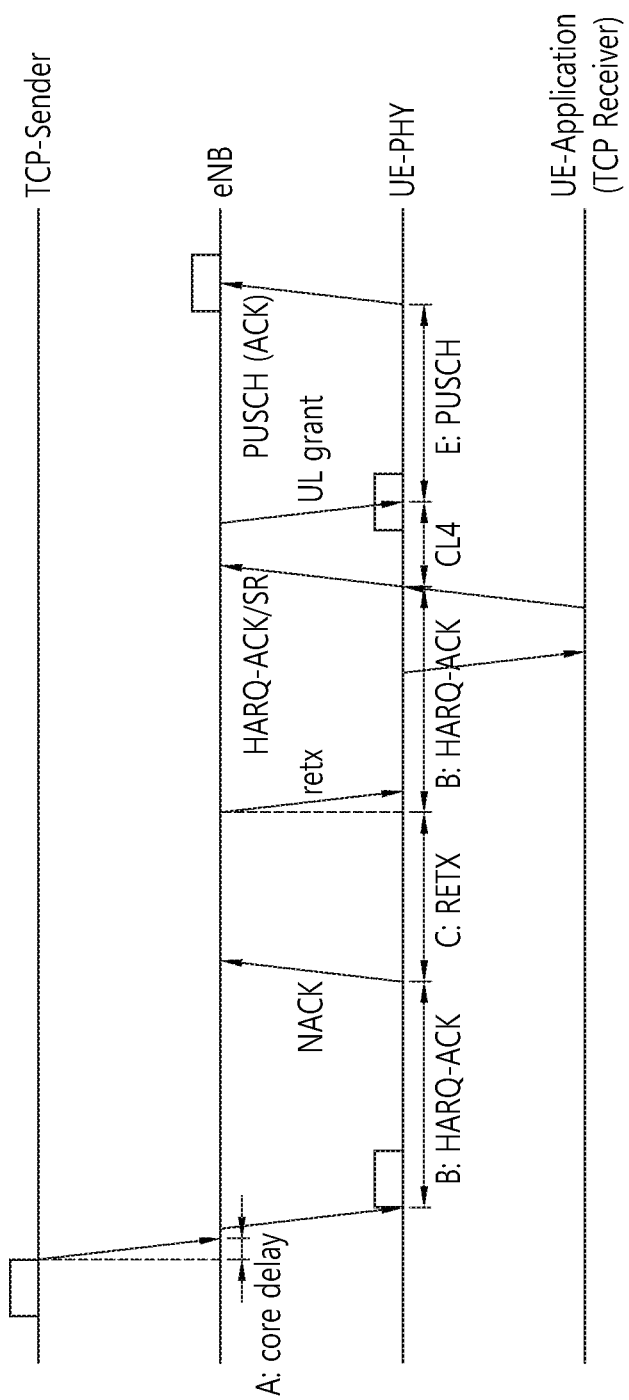
FIG. 7 shows an example of typical radio access latency components.

FIG. 7 shows an example of typical radio access latency components. Referring to FIG. 7, the latency of one transmission control protocol (TCP) segment latency may be represented as core delay (A)+HARQ-ACK feedback latency (B)+0.1*retransmission latency (C)+0.1*HARQ-ACK feedback latency (B)+eNB processing delay (D)+PUSCH transmission delay (E). Among these components of latency, HARQ-ACK feedback latency (B), retransmission latency (C) and PUSCH transmission delay (E) may relate to a length of TTI. Roughly, it may be assumed that 4*TTIs are used for B and C and 3*TTIs are used for E. Accordingly, total 11*TTIs may be assumed for B+C+E. If any unavailability due to MBSFN subframe or TDD configuration is not considered, the overall latency of B, C and E can be linearly decreased with short TTI. Though the latency of one packet becomes smaller as the TCP window size gets larger, the length of TTI may impact the overall latency.

In TDD, delay computation may become challenging, as B, C and E may be decided dependent on UL-DL configurations shown in Table 1. For example, if UL-DL configuration 0 is used, the maximum gap of retransmission latency (C) may be larger than 3 ms (from a special subframe to the next DL subframe) which may not be further reduced unless DL subframes using short TTI are placed in between. For another example, if UL-DL configuration 5 is used, the maximum gap of PUSCH transmission may be larger than 8 ms (from subframe #3 to the next radio frame's first UpPTS) unless UL subframes using short TTI are placed in between.

Accordingly, in order to reduce latency, short TTI which is shorter than current TTI (i.e. 1 ms) may be proposed. For example, if it is assumed that the short TTI is 0.2 ms and RTT from the data transmission to the HARQ-ACK is 8*TTI, the overall latency between the data transmission to HARQ-ACK reception may be reduced to 1.6 msec. Furthermore, the short TTI may be designed such that a carrier where the short TTI is used can be accessed by a legacy UE which does not understand a frame structure for the short TTI. When a short TTI is introduced for latency reduction in LTE, E-UTRAN may be configured with both normal TTI with 1 ms and short TTI with a value less than 1 ms, such as 1 symbol or 0.5 ms.

The latency reduction by the short TTI may be fully achieved when all subframes are available for the short TTI, i.e. subframes using the short TTI are placed consecutively. Otherwise, the latency reduction by the short TTI cannot be fully achieved. For example, HARQ-ACK cannot be transmitted due to unavailable UL subframes or PHICH cannot be transmitted due to unavailable DL subframes (such as MBSFN subframes). In this case, the latency may not be reduced substantially.

The present invention discusses handling MBSFN subframes for short TTI.

Figure 8:
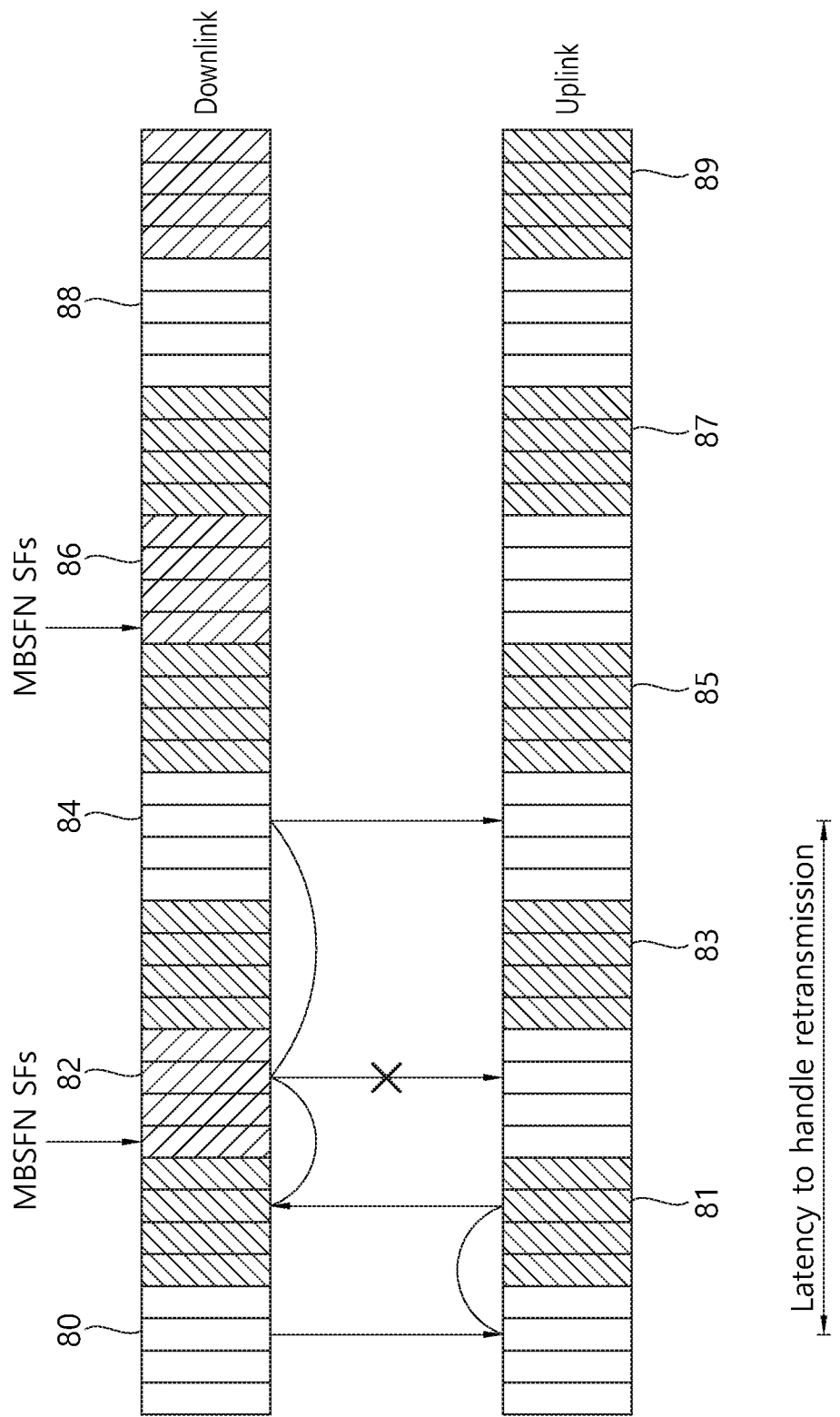
FIG. 8 shows an example of a problem of MBSFN subframes for short TTI.

FIG. 8 shows an example of a problem of MBSFN subframes for short TTI. Referring to FIG. 8, a short TTI is configured as 0.25 ms, which is ¼ of the current TTI. Accordingly, one subframe consists of 4 TTIs. DL transmission is performed at the first short TTI subframe (80), and UL transmission is performed at the second short TTI subframe (81). DL transmission, as a response to the UL transmission at the second short TTI subframe (81), is to be performed at the third short TTI subframe (82). For example, if PUSCH is transmitted at the second short TTI subframe (81), the PHICH carrying ACK/NACK for the PUSCH may be transmitted at the third short TTI subframe (82). However, it is assumed that the third short TTI subframe (82) is configured as MBSFN subframe. In MBSFN subframe, DL transmission may not be possible if multimedia broadcast multicast services (MBMS) is transmitted other than in the first two OFDM symbols. In this case, DL transmission, as a response to the UL transmission at the second short TTI subframe (81), has to be performed at the sixth short TTI subframe (85), and accordingly, latency may occur to handle retransmission.

To minimize unavailable subframes used for the short TTI, one of the following options may be considered.

(1) MBSFN subframe may be used for the short TTI transmission if PHICH or other scheduled data transmission needs to be transmitted. In this case, the network may not transmit MBMS even though MBMS transmission is configured. That is, MBMS transmission may be dropped, which may degrade the performance of MBMS. Alternatively, some subframes may not be used for the short TTI transmission due to MBMS transmission, based on the assumption that MBMS transmission may not be interrupted. Alternatively, short TTI transmission may be transmitted with MBMS transmission where short TTI transmission may follow MBMS numerology (e.g. extended CP with or without different subcarrier spacing).

(2) Frequency division multiplexing (FDM) between short TTI and legacy TTI

Figure 9:
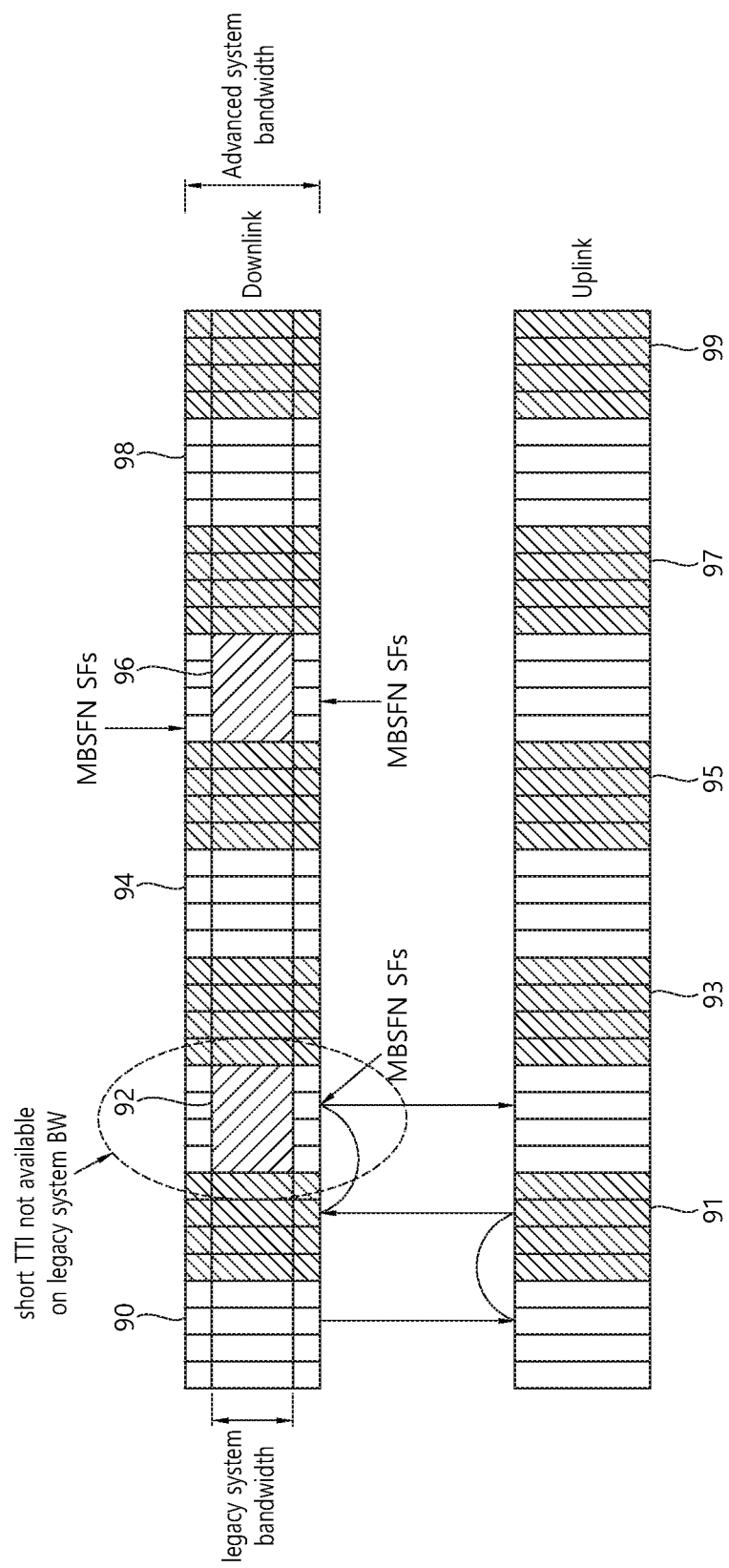
FIG. 9 shows an example of FDM between a subframe using short TTI and a subframe using legacy TTI according to an embodiment of the present invention.

FIG. 9 shows an example of FDM between a subframe using short TTI and a subframe using legacy TTI according to an embodiment of the present invention. In order to allow short TTI opportunity even in MBSFN subframe, a legacy system bandwidth, which is smaller than the available system bandwidth of the carrier, may be indicated to a legacy UE. MBSFN subframe using the legacy TTI may be configured only in the legacy system bandwidth. The advanced system bandwidth, which may be the same as the available system bandwidth of the carrier, may be indicated to an advanced UE. Remaining frequencies except the legacy system bandwidth may be used for short TTIs. Accordingly, MBSFN subframes using the legacy TTI in the legacy system bandwidth and short TTI subframe may be multiplexed by FDM.

Referring to FIG. 9, a short TTI is configured as 0.25 ms, which is ¼ of the current TTI. Accordingly, one subframe consists of 4 TTIs. DL transmission is performed at the first short TTI subframe (90), and UL transmission is performed at the second short TTI subframe (91). DL transmission is performed at the third short TTI subframe (92), in which MBSFN subframe is configured in the legacy system bandwidth and short TTI is configured in the remaining frequencies in the advanced system bandwidth. The short TTI is not available in the legacy system bandwidth. Therefore, DL transmission can be performed without additional latency.

In the subframe used for MBMS, it may be necessary to align CP between MBSFN subframe using the legacy TTI and short TTI subframe. This is similar to a case that larger system bandwidth than the system bandwidth indicated by SIB may be scheduled to advanced UEs. Further, CRS transmission may not occur in a region outside of the legacy system bandwidth. Further, PUCCH transmission for advanced UEs with short TTI may occur only in the region outside of the legacy system bandwidth.

When MBSFN subframe using the legacy TTI and short TTI subframe are multiplexed by FDM, the same CP used for MBSFN subframe may also be used for short TTI subframe. If short TTI length is larger than one or two OFDM symbols which may be the same as a length of non-MBSFN region, CP length may change within a short TTI for the advanced UEs. When CP changes from normal CP to extended CP, the number of REs in a TTI may also change. Furthermore, the length of TTI may also change. Alternatively, if different CP or numerology is used between short TTI and MBMS transmission (or between short TTI and legacy LTE transmission), gap may be necessary.

Figure 10:
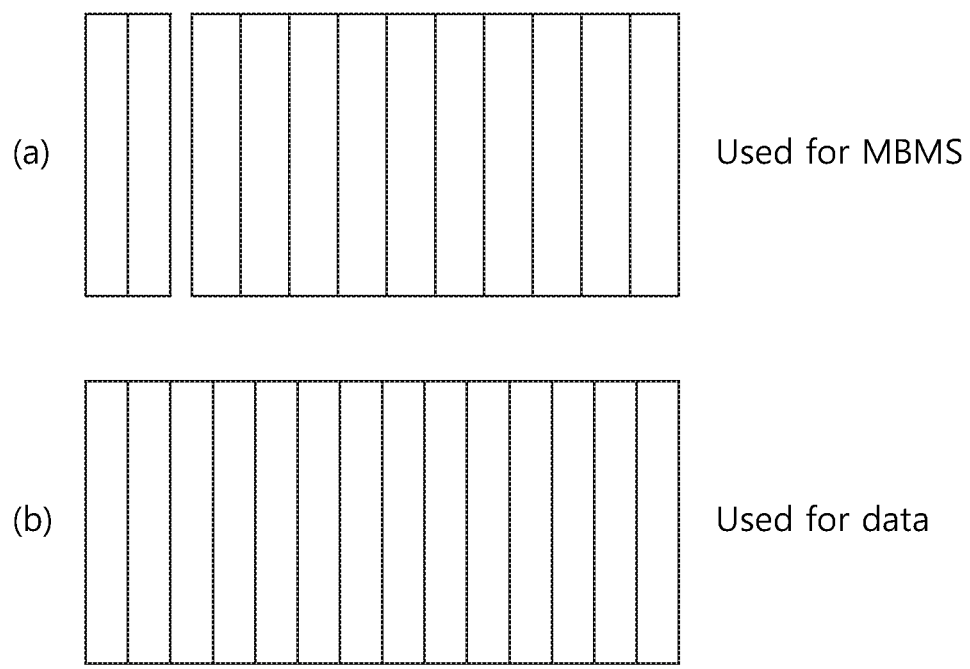
FIG. 10 shows an example of a length of symbol for MBSFN subframe according to an embodiment of the present invention.

FIG. 10 shows an example of a length of symbol for MBSFN subframe according to an embodiment of the present invention. FIG. 10-(a) shows a case when MBSFN subframe is used for MBMS transmission, and FIG. 10-(b) shows a case when MBSFN subframe is used for data transmission.

Figure 11:
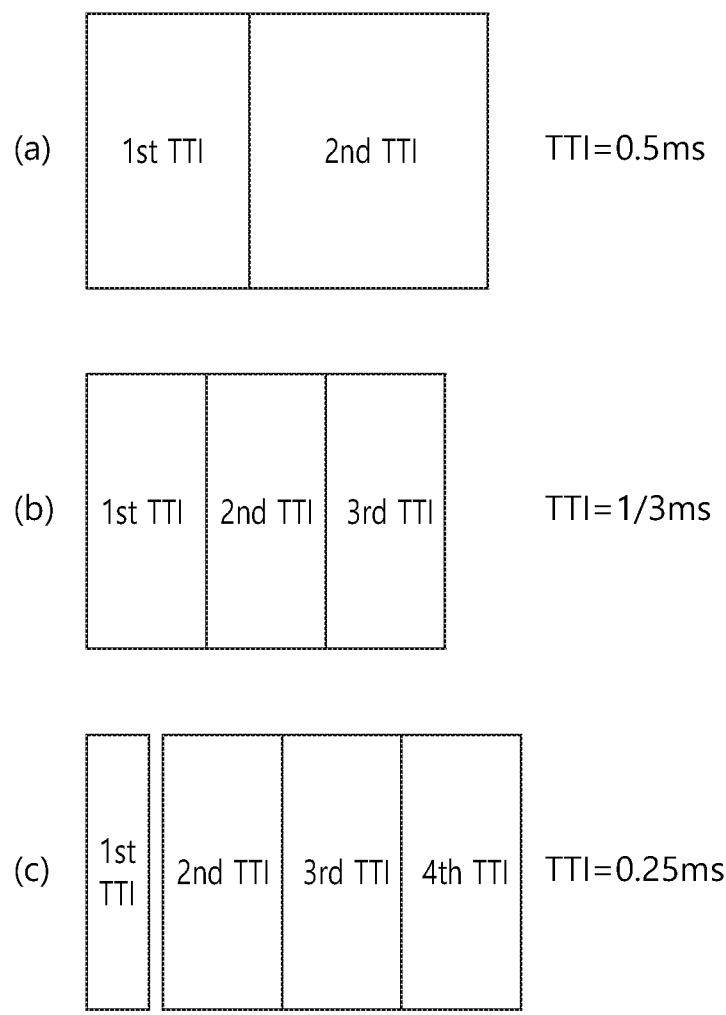
FIG. 11 shows an example of configuration of short TTI per different TTI size according to an embodiment of the present invention.

FIG. 11 shows an example of configuration of short TTI per different TTI size according to an embodiment of the present invention. In this embodiment, it is assumed that the MBSFN subframe is used for MBMS transmission. FIG. 11-(a) shows a case when a length of TTI is 0.5 ms (i.e. 2 short TTIs per 1 ms), FIG. 11-(b) shows a case when a length of TTI is ⅓ ms (i.e. 3 short TTIs per 1 ms), and FIG. 11-(c) shows a case when a length of TTI is 0.25 ms (i.e. 4 short TTIs per 1 ms).

When the MBSFN subframe is used for data transmission, the CP of the MBSFN subframe may follow the CP of the normal subframe for short TTI. As described above, since a length of OFDM symbol and the number of OFDM symbols may change depending on the CP length, thus, it is necessary to indicate whether the subframe is used with extended CP or normal CP. Since MBMS is rather semi-statically configured, the subframe which will be used for MBMS transmission (and thus used with extended CP) may be semi-statically indicated to advanced UEs via system information or higher layer signaling. If MBMS transmission is configured dynamically, dynamic indication may also be considered.

(3) A concept of carrier aggregation or dual connectivity may be utilized to make up the unavailable downlink subframes.

Figure 12:
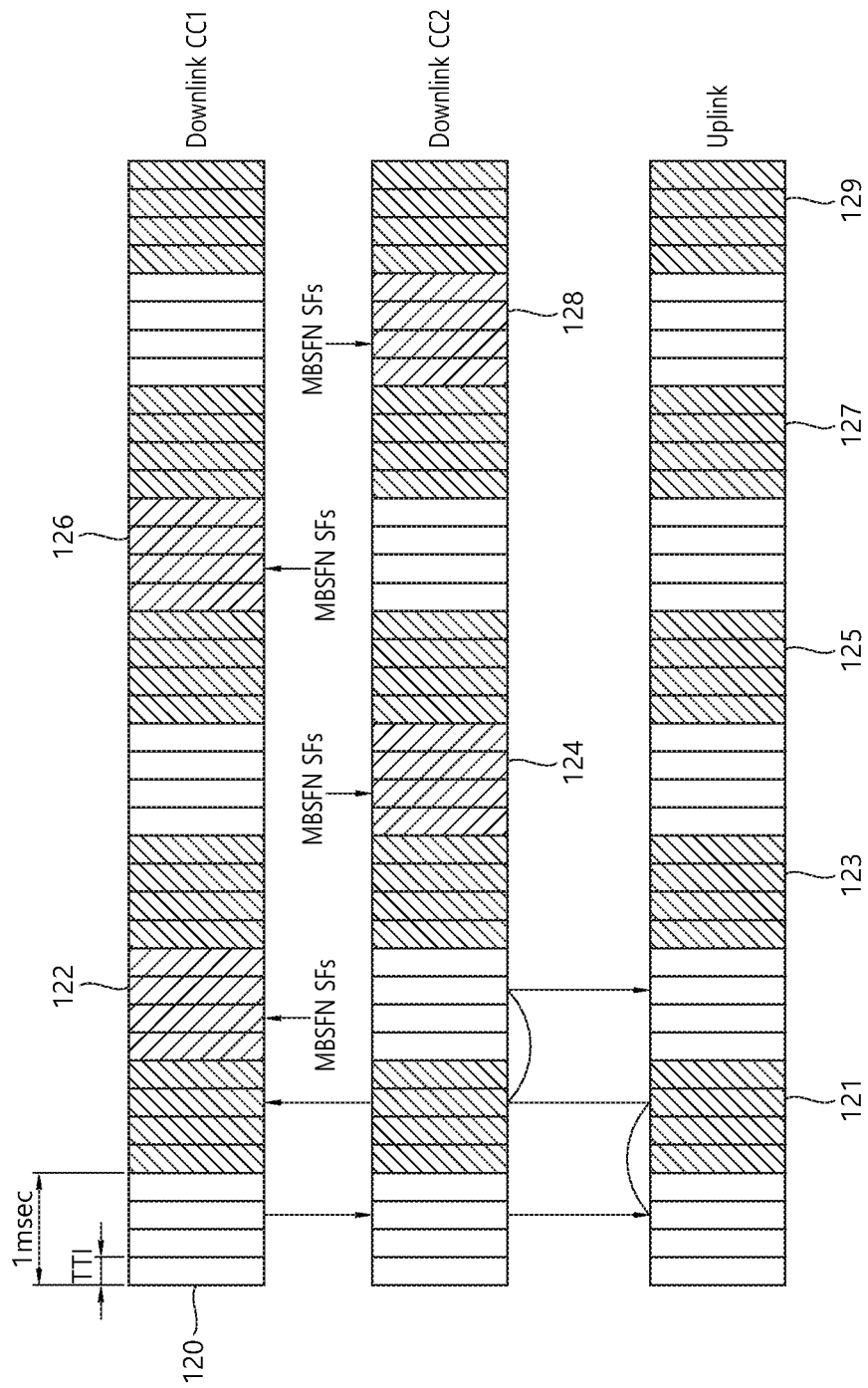
FIG. 12 shows an example of using multiple carries for short TTI according to an embodiment of the present invention.

FIG. 12 shows an example of using multiple carries for short TTI according to an embodiment of the present invention. Referring to FIG. 12, a short TTI is configured as 0.25 ms, which is ¼ of the current TTI. Accordingly, one subframe consists of 4 TTIs. For DL, two DL component carriers (CCs), i.e. DL CC1 and DL CC2, are configured by carrier aggregation, and for UL, one UL CC is configured.

DL transmission is performed at the first short TTI subframe (120), and UL transmission is performed at the second short TTI subframe (121). DL transmission, as a response to the UL transmission at the second short TTI subframe (121), is to be performed at the third short TTI subframe (122). In this embodiment, it is assumed that the third short TTI subframe (122) of DL CC1 is configured as MBSFN subframe. If DL CC1 cannot transmit data due to MBMS transmission, data transmission may be handed over to DL CC2. For example, PHICH or DL retransmission may be scheduled on DL CC. Therefore, DL transmission can be performed without additional latency. If DL CC2 is connected with DL CC1 via dual connectivity, high-speed backhaul between an eNB providing DL CC1 and an eNB providing DL CC2 may be required.

If PHICH is transmitted via DL CC2 rather than DL CC1 and PHICH is transmitted per each short TTI, the same resource may be used as if a UE is configured with a virtually one DL carrier, even though two physical DL carriers are used/aggregated for a UE. As there may be other UE(s) configured with different UL carrier (e.g. UL CC2) which will share DL CC2 for PHICH transmission where the same UL resource in different CC may collide in terms of PHICH resource, a UE may be configured with a secondary cell (SCell) index or a cell index which will be used for PHICH and/or scheduling (i.e. carrier indicator field (CIF) value). In other words, a UE configured with a virtual carrier may be configured with a cell index and cross-carrier scheduling principle may be used with the configured cell index to avoid potential resource collision. For example, SCell index larger than the maximum SCell index used for physical carrier aggregation may be used for a virtual carrier aggregation for the short TTI transmission.

The MBSFN subframe between DL CC1 and Dl CC2 should not be aligned such that at least one MBSFN subframe among configured/activated CC(s) are available to a UE for the short TTI transmission. This may imply that the subframe index of SCell may not be aligned with the subframe index of primary cell (PCell). For example, if MBSFN configuration between PCell and SCell is identical, a few subframe of SCell may be shifted. In other words, a UE may be configured with carriers which are not aligned in terms of subframe index. In terms of determining when to expect data from DL CC1 or another carrier (on behalf of DL CC1, e.g. DL CC2), semi-static higher layer signaling may be considered. Also, it may be dynamically indicated via DCI. For example, in UL grant, a CC for PHICH transmission corresponding to the UL transmission may be indicated.

Further, techniques mentioned for TDD with multiple carriers may also be applicable for this case including short TTI indexing. In this case, UL carrier for short TTI may be fixed to one FDD UL carrier if all UL subframes are available for short TTI transmission. If only subset of UL subframes are available for some reasons, similar technique to TDD may be used even for FDD case. If TDD subframe and FDD subframe are aggregated, in MBSFN FDD subframe, short TTI DL reception may occur in the aggregated TDD carrier if TDD carrier is DL subframe or is used for DL short TTI.

Figure 13:
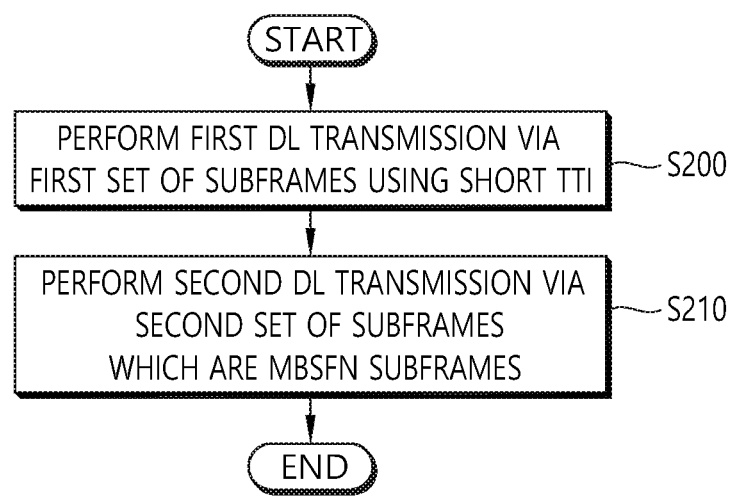
FIG. 13 shows a method for performing, by a network, a DL transmission using a short TTI according to an embodiment of the present invention.

FIG. 13 shows a method for performing, by a network, a DL transmission using a short TTI according to an embodiment of the present invention.

In step S200, the network performs a first DL transmission via a first set of subframes which are MBSFN subframes. In step S110, the network performs a second DL transmission via a second set of subframes using the short TTI. A length of the short TTI may be less than 1 ms. The first DL transmission may correspond MBMS transmission. The second DL transmission may correspond DL transmission as a response to UL transmission.

The first set of subframe may use a normal TTI, which corresponds to option (2) and FIG. 9 described above. The first set of subframes and the second set of subframes may be multiplexed by FDM. The first set of subframes may be configured in a legacy system bandwidth which is smaller than an available system bandwidth. And, the legacy system bandwidth may be indicated to a legacy UE. Further, the second set of subframes may be configured in a remaining bandwidth except the legacy system bandwidth in an advanced system bandwidth. And, the advanced system bandwidth may be indicated to an advanced UE. A CP of the first set of subframes and a CP of the second set of subframes may be aligned with each other.

Alternatively, the first set of subframes and the second set of subframes may be multiplexed by time division multiplexing (TDM). In this case, the second DL transmission may be performed after the first DL transmission is punctured.

Alternatively, the first set of subframe may use a short TTI, which corresponds to option (3) and FIG. 12 described above. The first set of subframes and the second set of subframes may be configured in different DL component carriers. The first set of subframes may be provided by a first eNB, the second set of subframes may be provided by a second eNB, and the first eNB and the second eNB may be connected with each other via dual connectivity.

The present invention described above may be applied to new radio access technology (RAT) as well. The new RAT may not have PDCCH which is transmitted in whole system bandwidth scrambled by cell ID. The new RAT may have at least one beam RS, which is similar to the current CRS, in one cell. The new RAT may have different subcarrier spacing compared to the current subcarrier spacing, mostly 15 kHz. The point is to consider one or more DL/UL switching points in one subframe/long TTI to allow further reduced latency. This may be useful if different applications with different latency requirements coexist (e g enhanced mobile broadband (eMBB) or ultra-reliable and low latency communications (URLLC)).

Figure 14:
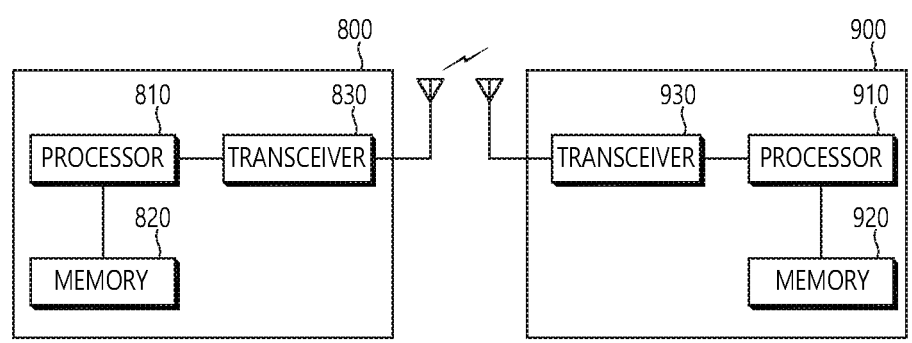
FIG. 14 shows a wireless communication system to implement an embodiment of the present invention.

FIG. 14 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a network node in a wireless communication system, the method comprising:
   performing a first DL transmission via a first set of subframes which are multicast-broadcast single-frequency network (MBSFN) subframes; and
   performing a second DL transmission via a second set of subframes using a short transmission time interval (TTI),
   wherein a length of the short TTI is less than 1 ms,
   wherein the first set of subframes uses a normal TTI,
   wherein the first set of subframes and the second set of subframes are multiplexed by time division multiplexing (TDM), and
   wherein the second DL transmission is performed after the first DL transmission is punctured.

2. The method of claim 1, wherein the first set of subframes and the second set of subframes are multiplexed by frequency division multiplexing (FDM).

3. The method of claim 1, wherein the first set of subframes is configured in a legacy system bandwidth which is smaller than an available system bandwidth.

4. The method of claim 3, further comprising indicating the legacy system bandwidth to a legacy UE.

5. The method of claim 3, wherein the second set of subframes is configured in a remaining bandwidth except the legacy system bandwidth in an advanced system bandwidth.

6. The method of claim 5, further comprising indicating the advanced system bandwidth to an advanced UE.

7. The method of claim 1, wherein the first set of subframes uses the short TTI.

8. The method of claim 7, wherein the first set of subframes and the second set of subframes are configured in different DL component carriers.

9. The method of claim 7, wherein the first set of subframes is provided by a first eNodeB (eNB),
   wherein the second set of subframes is provided by a second eNB; and
   wherein the first eNB and the second eNB are connected with each other via dual connectivity.

10. The method of claim 1, wherein the first DL transmission corresponds multimedia broadcast multicast services (MBMS) transmission.

11. The method of claim 1, wherein the second DL transmission corresponds DL transmission as a response to uplink (UL) transmission.

12. A network node in a wireless communication system, the network node comprising:
    a memory;
    a transceiver; and
    at least one processor, coupled to the memory and the transceiver, configured to:
    control the transceiver to perform a first downlink (DL) transmission via a first set of subframes which are multicast-broadcast single-frequency network (MBSFN) subframes, and
    control the transceiver to perform a second DL transmission via a second set of subframes using a short transmission time interval (TTI),
    wherein a length of the short TTI is less than 1 ms,
    wherein the first set of subframes uses a normal TTI,
    wherein the first set of subframes and the second set of subframes are multiplexed by time division multiplexing (TDM), and
    wherein the second DL transmission is performed after the first DL transmission is punctured.

* * * * *